United States Patent
Kuwabara et al.

(10) Patent No.: US 6,294,231 B1
(45) Date of Patent: Sep. 25, 2001

(54) OPTICALLY ANISOTROPIC FILM, METHOD OF MANUFACTURING THE SAME, AND LIQUID CRYSTAL DISPLAY APPARATUS

(75) Inventors: Masato Kuwabara; Koichi Fujisawa, both of Tsukuba (JP); Eckhard Hanelt, Geltendorf (DE); Thomas Kammel; Norman Haberle, both of Munich (DE)

(73) Assignees: Sumitomo Chemical Company, Limited, Osaka (JP); Consortium fur Electrochemische Industrie GmbH, Munich (DE)

( * ) Notice: Subject to any disclaimer, the term of this patent is extended or adjusted under 35 U.S.C. 154(b) by 0 days.

(21) Appl. No.: 09/397,918

(22) Filed: Sep. 17, 1999

(30) Foreign Application Priority Data

Sep. 17, 1998 (JP) .................................................. 10-262985

(51) Int. Cl.$^7$ ........................... C09K 19/38; C09K 19/20; G02F 1/1333; C08G 77/20
(52) U.S. Cl. ................. 428/1.52; 428/1.54; 252/299.64; 252/299.67; 252/299.7; 349/117; 349/183; 528/32; 528/34
(58) Field of Search ........................ 252/299.64, 299.01, 252/299.67, 299.7; 428/1.1, 1.52, 1.54; 349/117, 183; 528/32, 34

(56) References Cited

U.S. PATENT DOCUMENTS

| | | |
|---|---|---|
| 4,810,433 | 3/1989 | Takayanagi et al. . |
| 5,308,535 | 5/1994 | Scheuble et al. . |
| 5,472,635 | 12/1995 | Iida et al. . |
| 5,610,258 * | 3/1997 | Weitzel et al. ........................... 528/25 |
| 5,736,066 * | 4/1998 | Noguchi et al. ................. 252/299.01 |
| 5,875,014 * | 2/1999 | Kuwabara et al. .................... 349/117 |

FOREIGN PATENT DOCUMENTS

| | | |
|---|---|---|
| 0354753A2 | 2/1990 | (EP) . |
| 482620A | 4/1992 | (EP) . |
| 0524028 A1 | 1/1993 | (EP) . |
| 0527231 A1 | 2/1993 | (EP) . |
| 617111A | 9/1994 | (EP) . |
| 0678567A1 | 10/1995 | (EP) . |
| 0712013 A2 | 5/1996 | (EP) . |
| 2266599A | 11/1993 | (GB) . |
| 3-291601 | 12/1991 | (JP) . |
| 4-500284 | 1/1992 | (JP) . |
| 5-027119 | 2/1993 | (JP) . |
| 5-107413 | 4/1993 | (JP) . |
| 5-257013 | 10/1993 | (JP) . |
| 6-027433 | 2/1994 | (JP) . |
| 6-130227 | 5/1994 | (JP) . |
| 6-174293 | 6/1994 | (JP) . |
| 6-300916 | 10/1994 | (JP) . |
| 8-190094 | 7/1996 | (JP) . |
| 9-101517 | 4/1997 | (JP) . |

OTHER PUBLICATIONS

Gow–Pyng Cheng Jeng et al., Journal of Applied Polymer Science, vol. 47, No. 4, Jan. 20, 1993, pp. 697–706.

Guo–Ping Chang Chien et al; "Synthesis and Characterization of Terminally Carboxyl Ethylene Glycol Monomethyl Ethers–Substituted Side–Chain Liquid–Crystalline Polysiloxanes"; Journal of Polymer Science: Part A: Polymer Chemistry, vol. 31, (1993) pp. 2423 to 2436.

C. Burger et al; "Polysiloxanes and Polymers Containing Siloxane Groups"; Chapter 3, pp. 113 to 222.

"A New Retarder Showing a Reversible Retardation Change with Temperature", M. Kuwabara et al., SID 97 Digest pp. 667–670 (1997).

"Development of Temperature Compensating Retardation Film" M. Kuwabara et al., Sumitomo Kagaku 1997–II pp. 4–11.

\* cited by examiner

*Primary Examiner*—Shean C. Wu
(74) *Attorney, Agent, or Firm*—Birch, Stewart, Kolasch & Birch, LLP

(57) ABSTRACT

An optically anisotropic film obtained from a mixture comprising a polymer and a liquid crystal compound, wherein retardation of the optically anisotropic film at 80° C., 60° C. or 0° C. measured from a normal direction is 20–97%, 20–99% or 101–150%, respectively, of retardation at 30° C., and an absolute value of a deviation in retardation by said liquid crystal compound is not greater than 6% when the optically anisotropic film is held at 30% for 200 hours, has the temperature dependence in accordance with the temperature dependence of retardation of a liquid crystal display cell, and a small variation of retardation by the liquid crystal compound with the lapse of time, and thus is suitable for use in a liquid crystal display apparatus.

12 Claims, No Drawings

OPTICALLY ANISOTROPIC FILM, METHOD OF MANUFACTURING THE SAME, AND LIQUID CRYSTAL DISPLAY APPARATUS

BACKGROUND OF THE INVENTION

The present invention relates to an optically anisotropic film used for super twisted nematic (STN) type or electric field-controlled birefringence (ECB) type liquid crystal displays and the like, a process for the production thereof, and a liquid crystal display device using said film.

A retardation film can be obtained by uniaxially stretching a transparent thermoplastic polymer film and is used as an optical compensator (color compensator) to compensate for tinting in especially STN type or ECB type liquid crystal displays to improve their display performance. The liquid crystal display devices using such retardation films have advantages such as light weight, small thickness and low cost.

Recently, the opportunity of use of liquid crystal devices under a high-temperature condition has increased. For instance, they are adapted in a car navigation system which is set in an automobile for providing a visual geographical information and is gaining popularity among motorists.

Request is rising for application of relatively inexpensive STN type liquid crystal display to such a use. However, use of such a liquid crystal display under a high temperature condition involves a problem of reduced display performance because of difference in retardation between the STN liquid crystal cell and the retardation film at high temperatures.

Further, with enlargement of image area of the STN type liquid crystal displays, a problem has arisen in that the temperature in the liquid crystal cell may become non uniform due to heat conducting from the fluorescent tube used for backlight, resulting in different display performance in an image area.

Nevertheless, there is not yet available any optically anisotropic films which can meet both requirements for display quality and viewing angle characteristics when used in an environment which may be exposed to high temperatures, such as the interior of an automobile.

The reduction of display performance of the liquid crystal display devices at high temperatures may be attributed to the fact that generally the alignment of the liquid crystal molecules or polymer is relaxed as the ambient temperature rises. In this case, the degree of alignment relaxation of the low-molecular weight liquid crystal material used for the liquid crystal cell becomes higher than that of the polymer used for a retardation film, resulting in a greater change of retardation, so that the retardations in said two members, which has been set to be optimized at room temperature, deviates from the optimal level under high temperatures, resulting in imperfect color compensation of the liquid crystal cell and thus causing tinting and other problems leading to a reduction of the display performance. Thus, an optically anisotropic film which allows variation of retardation in conformity to the change of birefringence of the liquid crystal cell with temperature has been required.

Various types of optically anisotropic films using a liquid crystalline material have been proposed.

JP-A-3-291601 discloses a process for producing a retardation film, wherein in order to obtain a large-area and uniform retardation film, a solution having dissolved therein a liquid crystalline polymer substantially comprising a polyester having the ortho-substituted aromatic structural units is applied on a substrate having a known alignment film and subjected to a heat treatment to effect horizontal alignment.

The optical retardation in a retardation film is given as the product $\Delta n \cdot d$ of the refractive anisotropy of the film material ($\Delta n$) and the film thickness (d). In a retardation film in which only those of the liquid crystalline polymer molecules having large anisotropy of refractive index have been horizontally aligned, it needs to control the liquid crystalline polymer film thickness very precisely for obtaining uniform retardation throughout the film. This is, however, difficult and impractical in industrial production.

JP-T-4-500284 discloses a retardation film having the same temperature dependence and wavelength dependence as the liquid crystal molecules used in the liquid crystal cell, saod film comprising a side-chain type liquid crystal polymer having a linear or cyclic backbone. It is, however, difficult to make highly precise control of thickness of a film made of a side-chain type liquid crystal polymer with large anisotropy of refractive index.

JP-A-5-257013 discloses a retardation film obtained by dispersing liquid crystal molecules in a polymer film and stretching this film. But this reference is silent on what combination of liquid crystal compound and polymer with provide the desired effect.

The optically anisotropic films disclosed in the above references are indeed effective for reducing viewing angle dependence, but since stretched films of polymers having a high glass transition temperature are used, the change of retardation with temperature is very limited and insufficient for compensating temperature dependence of birefringence of the liquid crystal cell.

In the case of the films using a polymer liquid crystal, since the polymer liquid crystal is first aligned and then its alignment is fixed by cooling, it is necessary to use a polymer liquid crystal whose transition temperature from the liquid crystal phase to the glass phase is well higher than room temperature. However, since the glass transition temperature of crystallization temperature of the liquid crystal used in the liquid crystal cell is below room temperature, the temperature compensating effect is unsatisfactory.

JP-A-8-190094 discloses an optically anisotropic film mainly comprising a mixture of a transparent or semi-transparent polymer and a liquid crystal compound, wherein retardation of the optically anisotropic film at 80° C. is 20% to 97% of retardation at 30° C., and the content of the liquid crystal compound is 0.5% to 50% by weight based on the total weight of the liquid crystal compound and the polymer. It is also described that the liquid crystal compound may be a copolymer of liquid crystal oligomers having different side-chains.

Examples of liquid crystalline compounds which can be used in temperature controlled optically anisotropic films are liquid crystalline polysiloxanes. The properties of such polysiloxanes are described in the literature (e.g. C. Burger and F. H. Kreuzer, "Polysiloxanes and Polymer Containing Siloxane Groups" in "Silicon in Polymer Synthesis", Ed. H. R. Kricheldorf, Springer-Verlag, Berlin, Heidelberg, 1996, and references cited therein). It is known from a work of G. -P. Chang Chien et al. (J. Polym. Sci. A, 1993, 31, 2432–2436) that 4-(2-propenyloxy)benzoic acid [4-(methoxycarbonyl)phenyl]ester or 4-(2-propenyloxy) benzoic acid [4-(butoxycarbonyl)phenyl]ester attached by a hydrosilylation reaction to a polysiloxane with a chain length of 35 units result in polymers with liquid crystalline phase, although the monomers are crystalline compounds.

No application for such polymers is proposed in the work of Chien et al. For the purpose of the present invention, the polymers published in this work are not applicable, because their viscosity is too high due to their high molecular weight, the glass transition temperature of the polysiloxane with side groups of 4-(2-propylenoxy)benzoic acid [4-(methoxycarbonyl)phenyl]ester is too high and the isotropic transition of the polysiloxane with side groups of 4-(2-propylenoxy)benzoic acid [4-(butoxycarbonyl)phenyl]ester is too low.

BRIEF SUMMARY OF THE INVENTION

An object of the present invention is thus to provide an optically anisotropic film, which keeps the temperature dependence of the optical retardation that can respond to the temperature dependence of the retardation $\Delta n \cdot d$ of a liquid crystal display cell and has a little variation of retardation by a liquid crystal compound with the lapse of time at a constant temperature, a method of manufacturing such an optically anisotropic film and a liquid crystal display apparatus of excellent display properties using such an optically anisotropic film, a liquid crystalline copolymer, and a mesogenic compound which can be used as a starting material of said liquid crystalline copolymer.

The present invention provides a transparent or semi-transparent optically anisotropic film obtained from a mixture comprising at least a polymer and a liquid crystal compound, wherein (a) retardation of said optically anisotropic film at 80° C. measured from a normal direction is 20% to 97% of retardation at 30° C., or (b) retardation of said optically anisotropic film at 60° C. measured from a normal direction is 20% to 99% of retardation at 30° C., or (c) retardation of said optically anisotropic film at 0° C. measured from a normal direction is 101% to 150% of retardation at 30° C., and an absolute value of a variation in retardation by said liquid crystal compound is not greater than 6% when said optically anisotropic film is held at 30° C. for 200 hours, said retardation being measured at a wavelength of 546 nm.

The present invention also provides a method of manufacturing the optically anisotropic film mentioned above, which comprises molding a mixture of said polymer and said liquid crystal compound into a film, and stretching the film upon heating.

The present invention further provides a liquid crystal display apparatus using the optically anisotropic film mentioned above.

The present invention still further provide a liquid crystalline copolymer comprising recurring units of the formulae (6), (7) and (8) with the numbers $n_6$, $n_7$ and $n_8$ of the recurring units (6), (7) and (8), respectively, wherein the ratio of $n_6/(n_7+n_8)$ is in the range of 98/2 to 5/95:

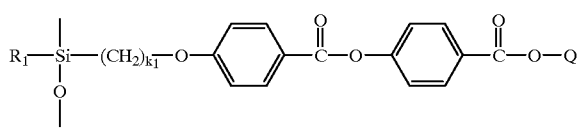

(6)

(7)

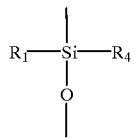

(8)

wherein
—Si—O— constitutes a cyclic or linear chain;
$R_1$ is an alkyl group containing 1 to 10 carbon atoms, an alkoxy group containing 1 to 10 carbon atoms, or a phenyl group;
Q is a straight-chain alkylene group having 1 to 12 $CH_2$ groups, wherein isolated, non adjacent $CH_2$-groups may be replaced by one or more oxygen atoms, or a cyclohexane group, which may be substituted with a $C_1$–$C_3$ alkyl group, or $C_1$–$C_3$ alkoxy group at the 4-position;
$R_3$ is a hydrocarbon group containing 3 to 30 carbon atoms, a 4-(cholesteryloxycarbonylphenyl)oxyalkene group, or a group of the formula:

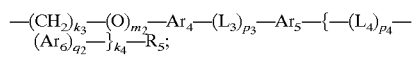

$R_4$ is a hydrocarbon group containing 3 to 30 carbon atoms, or a group of the formula:

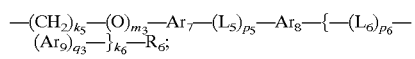

$k_1$, $k_3$ and $k_5$ are independently integers 2 to 10;
$k_4$, $k_6$, $m_2$, $m_3$, $p_3$, $p_4$, $p_5$, $p_6$, $q_2$, and $q_3$ are independently integers of 0 or 1;
$Ar_4$, $Ar_5$, $Ar_6$, $Ar_7$, $Ar_8$, and $Ar_9$, are independently a 1,4-phenylene-, 1,4-cyclohexylene-, pyridine-2,5-diyl-, or pyrimidine-2,5-diyl group;
$L_3$, $L_4$, $L_5$, and $L_6$ are independently —$CH_2$—O—, —O—$CH_2$—, —COO—, —OCO—, $CH_2$—$CH_2$—, —CH=N—, —N=CH—, —N=N—, —N(O)=N— or —N=(O)—;
$R_5$ and $R_6$ are independently a hydrogen atom, a halogen atom, a cyano group, or a linear or cyclic alkyl group in which one or more non adjacent methylene ($CH_2$) groups can be replaced by oxygen atoms.

The present invention moreover provides a mesogenic compound of the formula:

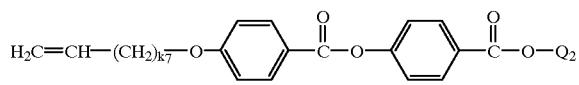

(9)

wherein
$k_7$ is an integer of 0 to 8; and
$Q_2$ is a straight-chain alkylene group having 5 to 12 $CH_2$ groups, wherein isolated, non adjacent $CH_2$ groups may be replaced by one or more oxygen atoms or a cyclohexane group which may be substituted with a $C_1$–$C_3$ alkyl group or $C_1$–$C_3$ alkoxy group at the 4-position.

DETAILED DESCRIPTION OF THE INVENTION

As a result of intensive studies, the present inventors have found that an optically anisotropic film, which is obtained by mixing a liquid crystal compound with a polymer and has specific physical properties (hereinafter the polymer may be referred to as the "matrix polymer" or simply as the "matrix"), can attain the above object and that such an optically anisotropic film gives a liquid crystal display apparatus having an excellent black and white level even in a low temperature range, and have completed the present invention. In the present invention, the liquid crystal compound or a mixture of liquid crystal compounds is selected in such a way that its glass transition temperature is lower than the temperature range required for the temperature dependence of the optical retardation of the optically anisotropic film and it is additionally selected in such a way that its clearing point allows to adjust the temperature dependence of the retardation of the film to the corresponding temperature dependence of the liquid crystal display cell.

The present inventors also found that 4-(2-propenyloxy) benzoic acid [4-(propoxycarbonyl)phenyl]ester and the homologous [4-(butoxycarbonyl)phenyl]ester, and especially the higher derivatives from pentyloxy- to dodecyloxy-carbonyl derivatives (often having liquid crystalline properties of their own in contrast to the known esters according to Chien et al., as demonstrated in Example 9 mentioned below), added to suitable siloxanes, lead to compounds with very low glass transition temperature, low clearing points and undisturbed nematic phases. Using polysiloxanes with shorter chain lengths and side groups with longer alkyl groups as ester component than known from the prior art results in liquid crystalline polymers which fulfil the requirements of the present invention much better. These materials exhibit lower viscosity and a glass transition temperature below 10° C. which is essential to control the retardation of the optically anisotropic films at room temperature. Moreover, it was surprisingly found that the disclosed higher 4-(2-propenyloxy)benzoic acid [4-(alkoxycarbonyl)phenyl] esters are especially well suited to obtain a broad temperature range of the liquid crystalline phase, if they are combined in a copolymer with other side groups characterized by a high isotropic transition temperature, e.g. 4-(2-propenyloxy)benzoyloxy-4-(4'-methoxybenzoyl) phenylester. By adjusting the number ratio of appropriate side-chain groups, the glass transition and the isotropic transition can be adjusted to the specified values.

Preferable bodiments of the present invention are as follows.

[1] A transparent or semi-transparent optically anisotropic film obtained from a mixture comprising at least a polymer and a liquid crystal compound, wherein retardation of said optically anisotropic film at 80° C. measured from a normal direction is 20% to 97% of retardation at 30° C., and an absolute value of a variation in retardation by said liquid crystal compound is not greater than 6% when said optically anisotropic film is held at 30° C. for 200 hours, said retardation being measured at a wavelength of 546 nm.

[2] A transparent or semi-transparent optically anisotropic film obtained from a mixture comprising a polymer and a liquid crystal compound, wherein retardation of said optically anisotropic film at 60° C. measured from a normal direction is 20% to 99% of retardation at 30° C., and an absolute value of a variation in retardation by said liquid crystal compound is not greater than 6% when said optically anisotropic film is held at 30° C. for 200 hours, said retardation being measured at a wavelength of 546 nm.

[3] A transparent or semi-transparent optically anisotropic film obtained from a mixture comprising a polymer and a liquid crystal compound, wherein retardation of said optically anisotropic film at 0° C. measured from a normal direction is 101% to 150% of retardation at 30° C., and an absolute value of a variation in retardation by said liquid crystal compound is not greater than 6% when said optically anisotropic film is held at 30% C for 200 hours, said retardation being measured at a wavelength of 546 nm.

[4] An optically anisotropic film in accordance with any one of [1] through [3] mentioned above, wherein said liquid crystal compound comprises a liquid crystal copolymer comprising recurring units of the formulae (1), (2) and (3), with the numbers $n_1$, $n_2$, and $n_3$ of the recurring units (1), (2) and (3), respectively, wherein the ratio of $n_1$ to $(n_2+n_3)$ is in a range of 98/2 to 20/80 per molecule on average, and a ratio of $n_2$ to $n_3$ is in a range of 100/0 to 20/80 per molecule on average:

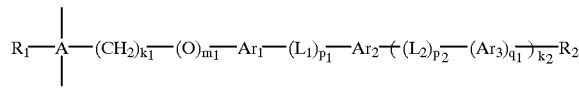

(1)

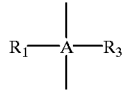

(2)

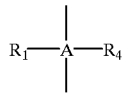

(3)

wherein A in the formulae (1), (2) and (3) is a group of the formulae (4) or (5),

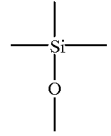

(4)

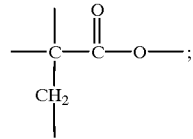

(5)

$R_1$ is an alkyl group having 1 to 6 carbon atoms, or an alkoxy group having 1 to 6 carbon atoms, when A is the formula (5);

$R_1$ is an alkyl group having 1 to 10 carbon atoms, an alkoxy group having 1 to 10 carbon atoms, or a phenyl group, when A is the formula (4); $R_3$ is a hydrocarbon group having 3 to 30 carbon atoms, a 4-(cholesteryloxycarbonylphenyl)-oxyalkene group, or a group of the formula:

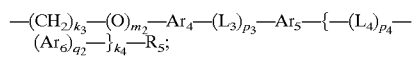

$R_4$ is a hydrocarbon group having 3 to 30 carbon atoms, or a group of the formula:

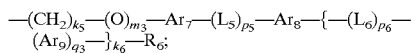
(Ar$_9$)$_{q_3}$—}$_{k_6}$—R$_6$;

K$_1$, K$_3$ and K$_5$ are independently integers of 2 to 10; k$_2$, k$_4$, k$_6$, m$_1$, m$_2$, m$_3$, p$_1$, p$_2$, p$_3$, p$_4$, p$_5$, p$_6$, q$_1$, q$_2$ and q$_3$ are independently zero or 1;

Ar$_1$, Ar$_2$, Ar$_3$, Ar$_4$, Ar$_5$, Ar$_6$, Ar$_7$, Ar$_8$, and Ar$_9$ are independently a 1,4-phenylene group, 1,4-cyclohexylene group, a pyridine-2,5-diyl group, or a pyrimidine-2,5-diyl group;

L$_1$, L$_2$, L$_3$, L$_4$, L$_5$ and L$_6$ are independently a divalent group such as —CH$_2$—O—, —O—CH$_2$—, —COO—, —OCO—, —CH$_2$—CH$_2$—, —CH=N—, —N=CH—, —N=N—, —N(O)=N— or —N=N(O)—; and R$_2$, R$_5$ and R$_6$ are independently a hydrogen atom, a halogen atom, a cyano group, a straight-chain or cyclic alkyl group wherein isolated —CH$_2$— group(s) may be substituted with oxygen atom(s).

[5] A method for manufacturing an optically anisotropic film in accordance with any one of [1] trough [4] mentioned above, said method comprising the steps of: molding a mixture of said polymer and said liquid crystal compound into a film; and stretching said film upon heating.

[6] A liquid crystal display apparatus using an optically anisotropic film in accordance with any one of [1] through [4] mentioned above.

[7] A liquid crystalline copolymer comprising recurring units of the formulae (6), (7) and (8) with the numbers n$_6$, n$_7$ and n$_8$ of the recurring units (6), (7) and (8), respectively, wherein the ratio of n$_6$/(n$_7$+n$_8$) is in the range of 98/2 to 5/95;

(6)

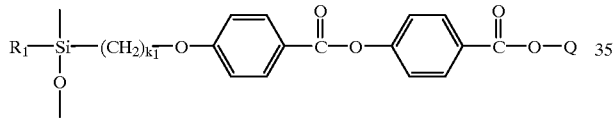

(7)

(8)

wherein the group —Si—O— may linear or cyclic; R$_1$ is an alkyl group having 1 to 10 carbon atoms, an alkoxy group having 1 to 10 carbon atoms, or a phenyl group; Q is an alkylene group having 1 to 12 CH$_2$ groups wherein each isolated CH$_2$ group may be substituted with an oxygen atom, or a cyclohexane group which may be substituted with an alkyl group having 1 to 3 carbon atoms or an alkoxy group having 1 to 3 carbon atoms at the 4-position; R$_3$ is a hydrocarbon group having 3 to 30 carbon atoms, a 4-(cholestenyl-oxycarbonylphenyl)oxyalkene group, or a group of the formula:

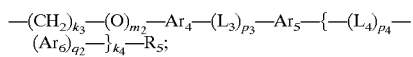
(Ar$_6$)$_{q_2}$—}$_{k_4}$—R$_5$;

R$_4$ is a hydrocarbon group having 3 to 30 carbon atoms, or a group of the formula:

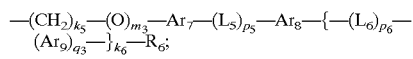
(Ar$_9$)$_{q_3}$—}$_{k_6}$—R$_6$;

k$_1$, k$_3$ and k$_5$ are independently integers of 2 to 10; k$_4$, k$_6$, m$_2$, m$_3$, p$_3$, p$_4$, p$_5$, p$_6$, q$_2$ and q$_3$ are independently zero or 1;

Ar$_4$, Ar$_5$, Ar$_6$, Ar$_7$, Ar$_8$, and Ar$_9$ are independently a 1,4-phenylene group, a 1,4-cyclohexylene group, a pyrridine-2,5-diyl group, or a pyrimidine-2,5-diyl group; L$_3$, L$_4$, L$_5$, and L$_6$ are independently —CH$_2$—O—, —O—CH$_2$—, —COO—, —OCO—, —CH$_2$—CH$_2$—, —CH=N—, —N=CH—, —N=N—, —N(O)=N—, or —N=N(O)—; and R$_5$ and R$_6$ are independently a halogen atom, a cyan group or a straight-chain or cyclic alkyl group wherein each isolated CH$_2$ group may be substituted with an oxygen atom.

[8] A mesogenic compound of the formula:

(9)

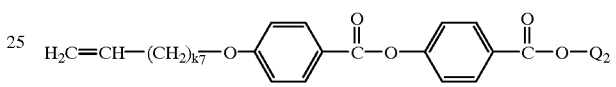

wherein k$_7$ is an integer of 0 to 8; and Q$_2$ is an alkylene group having 5 to 12 CH$_2$ groups wherein each isolated CH$_2$ group may be substituted with an oxygen atom, or a cyclohexane group which may be substituted with an alkyl group having 1 to 3 carbon atoms or an alkoxy group having 1 to 3 carbon atoms at the 4-position.

The temperature dependence of retardation of the optically anisotropic film according to the present invention can be optimally selected, in response to the temperature dependence of the retardation Δn·d of a liquid crystal display cell used in combination. Namely the retardation of the optically anisotropic film is decreased with an increase in the temperature of the liquid crystal display cell, and is increased with a decrease in the temperature of the liquid crystal display cell.

As for the temperature dependence of retardation in the optically anisotropic film [1] of the present invention, the retardation at 80° C. is 20% to 97% of the retardation at 30° C., preferably 60% to 95%, more preferably 70% to 93% (wherein retardation is measured at a wavelength of 546 nm).

In the optically anisotropic film [1], it is preferable that the retardation of the film at 60° C. measured from the normal direction is 20% to 99% of the retardation at 30° C (wherein retardation is measured at a wavelength of 546 nm).

It is also preferable that the retardation of the optically anisotropic film at 0° C. measured from the normal direction is 101% to 150% of the retardation at 30° C. (wherein retardation is measured at the wavelength of 546 nm).

As for the temperature dependence of the retardation in the optically anisotropic film [2] of the present invention, the retardation at 60° C. is 20% to 99% of the retardation at 30° C., preferably 60% to 98%, more preferably 70% to 97%.

In the optical anisotropic film [2], it is preferable that the retardation of the film at 0° C. measured from the direction of its normal is 101% to 150% of retardation at 30° C. (wherein retardation is measured at a wavelength of 546 nm).

As for the temperature dependence of the retardation in the optically anisotropic film [3] of the present invention, the retardation at 0° C. is 101% to 150% of retardation at 30° C.

The optically anisotropic films [1], [2] and [3] of the present invention are characterized by absolute values of a variation in retardation by the liquid crystal compound that is not greater than 6% when the optically anisotropic film is held at 30° C. for 200 hours (wherein retardation is measured at a wavelength of 546 nm).

Available techniques for regulating the temperature dependence of retardation in the optically anisotropic film include a method of mixing liquid crystal compounds having different isotropic phase transition temperatures, a method of varying the mixing ratio of the liquid crystal compound to the matrix, a method of using a matrix polymer having a different intrinsic birefringence, and a method of varying the stretching conditions to control the retardation of the matrix.

The retardation $R_{film}$ (T) of the optically anisotropic film of the present invention at a predetermined temperature T is expressed at the sum of the retardation $R_{LC}$ (T) by the liquid crystal compound and the retardation $R_{polymer}$ (T) by the polymer as shown by the equation (A) given below:

$$R_{film}(T)=R_{LC}(T)+R_{polymer}(T) \tag{A}$$

Upon condition that the optically anisotropic film is heated to temperatures that are at least 10° C. higher than the liquid crystal phase—isotropic phase transition temperature (Ti) as measured by a differential scanning calorimeter (DSC) and that the retardation $R_{LC}$ (Ti+10° C.) by the liquid crystal compound is equal to zero, the retardation $R_{film}$ (Ti+10° C.) of the optically anisotropic film is regarded as the retardation $R_{polymer}$ (Ti+10° C.) by the polymer.

The retardation by the liquid crystal compound while the optically anisotropic film is kept at a predetermined temperature T is thus calculated by subtracting the retardation by the polymer $R_{polymer}$ (Ti+10° C.) from the measured retardation $R_{film}$ (T) of the optically anisotropic film.

In the present invention, the variation in retardation by the liquid crystal compound when the optically anisotropic film is held at 30° C. for 200 hours is calculated according to the equation (B) given below, wherein $R_{LC}$ (30° C.: 0 hour) represents retardation by the liquid crystal compound calculated as above after the optically anisotropic film is heated for two hours at temperatures of at least 10° C. higher than the liquid crystal phase–isotropic phase transition temperature of the liquid crystal compound, and $R_{LC}$ (30° C.: 200 hours) measured and calculated when 200 hours have elapsed from the heating:

Variation in Retardation=$\{R_{LC}(30°$ C.: 200hours$)-R_{LC}(30°$ C.: 0hour$)\}/R_{LC}(30°$ C.: 0 hours) (B)

In the optically anisotropic film of the present invention, the absolute value of the variation in retardation by the liquid crystal compound when the optically anisotropic film is held at 30° C. is not greater than 6%.

In the optically anisotropic film of the present invention, the retardation caused by a liquid crystal display cell, especially a STN-type liquid crystal display cell or an ECB-type liquid crystal display cell, is mainly compensated by the liquid crystal compound included in the matrix. It is accordingly preferable that the liquid crystal compound has properties, such as the refractive index and the temperature dependence of the refractive index anisotropy, similar to those of the liquid crystal usaed in the liquid crystal display cell, especially the liquid crystal used in the STN-type liquid crystal display cell (hereinafter may be referred to as the STN liquid crystal) or the liquid crystal used in the ECB-type liquid crystal display cell.

The value of retardation of the optically anisotropic film of the present invention measured from the direction of the normal to the film (wavelength of measurement: 546 nm) is preferably 50 nm to 2000 nm, more preferably 100 nm to 1500 nm.

It is preferable that the liquid crystal compound of the present invention is a side-chain liquid crystal copolymer comprising the recurring units defined by the formulae (1), (2) and (3). The optically anisotropic film of the present invention may be produced by using a mixture of two or more side-chain liquid crystal copolymers, or may further include at least one different kind of side-chain liquid crystal copolymer, a liquid crystal polymer, a nematic liquid crystal copolymer, a liquid crystal homo oligomer, and a low-molecular weight liquid crystal material, other than the said side-chain liquid crystal copolymer.

As a skeleton of said liquid crystal copolymer comprising the recurring units (1), (2) and (3) (hereinafter may be referred to simply as the "liquid crystal copolymer"), there can be used the group represented by the formula (4) in either a linear or a cyclic form. The liquid crystal copolymer is preferably in the nematic phase or in the smectic phase since the nematic liquid crystal and the smectic liquid crystal are readily oriented in a specific direction. As the group providing the liquid crystal property (hereinafter may be referred to as the "mesogen group"), there can be generally be used that bound to the main chain via a flexible chain (hereinafter may be referred to as the "spacer").

The liquid crystal copolymer used in the present invention has the ratio of $n_1/(n_2+n_3)$ in a range of 98/2 to 20/80 per molecule on average, and the ratio of $n_2$ to $n_3$ is in a range of 100/0 to 20/80 per molecule on average, where $n_1$, $n_2$ and $n_3$ independently represent a number of recurring units (1), a number of recurring units (2) and a number of recurring units (3) respectively, per molecule of the liquid crystal copolymer. The liquid crystal copolymer, which is used for preparation of the optically anisotropic film, is preferably in the nematic phase or in the smectic phase in an expected temperature range, that is, in the range of –30° C. to 120° C.

The liquid crystal copolymer satisfying such a temperature range may be used alone, or otherwise one or a plurality of liquid crystal compounds may be mixed with the liquid crystal copolymer to keep the temperature in the above range.

The recurring units (1), (2) and (3) of said liquid crystal copolymers include the following chemical structures:

(1)

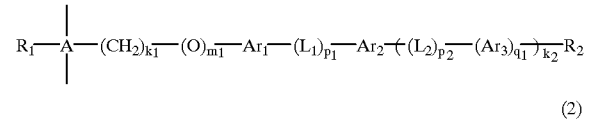

(2)

(3)

wherein in said formulae (1), (2) and (3), A is a group of the formulae (4) or (5):

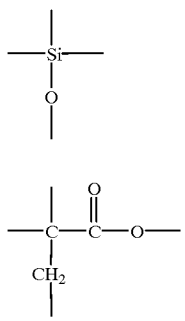

In the formula (4), —Si—O— constituting the main chain of the formulae (1), (2) and (3) maybe cyclic or linear.

In the formula (5), —C—CH$_2$— constitutes a main chain in the formulae (1), (2) and (3), and —COO— group is bound to (CH$_2$)k$_1$ group in the formula (1), and to R$_3$ group in the formula (2), and to R$_4$ group in the formula (3).

In the formulae (1), (2) and (3), when A is expressed by the formula (5), R$_1$ is an alkyl group containing 1 to 6 carbon atoms including methyl, ethyl, propyl, butyl, pentyl, and hexyl, or alkoxy group containing 1 to 6 carbon atoms including methoxy, ethoxy, propyloxy, butoxy, pentyloxy, and hexyloxy.

In the formulae (1), (2) and (3), when A is the formula (4), R$_1$ is an alkyl group containing 1 to 10 carbon atoms including methyl, ethyl, propyl, butyl, pentyl, hexyl, heptyl, octyl, nonyl and decyl, an alkoxy group containing 1 to 10 carbon atoms including methoxy, ethoxy, propyloxy, butoxy, pentyloxy, hexyloxy, heptyloxy, octyloxy, nonyloxy and decyloxy, or a phenyl group.

In the formula (2), R$_3$ is a hydrocarbon group containing 3 to 30 carbon atoms including methyl, ethyl, propyl, butyl, pentyl, hexyl, heptyl, octyl, nonyl, decyl, dodecyl, tetradecyl, hexadecyl and eicosanyl, a 4-(cholesteryloxycarbonylphenyl)oxyalkene group preferably 4-(cholesteryloxycarbonylphenyl)oxy(1,3-propylen) or (cholesteryloxycarbonylphenyl)oxy(1,4-butylen),

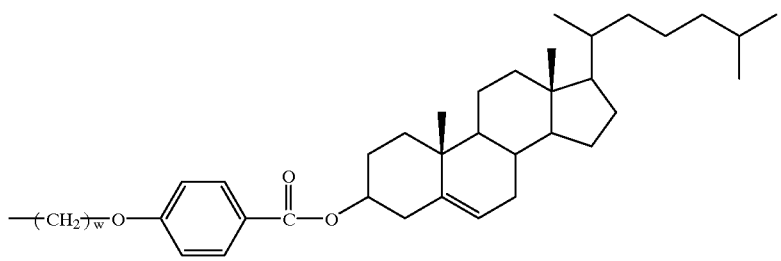

wherein w is 3 or 4, or a group of the formula:

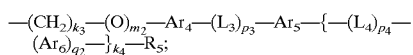

In the formula (3), R$_4$ is a hydrocarbon group containing 3 to 30 carbon atoms including methyl, ethyl, propyl, butyl, pentyl, hexyl, heptyl, octyl, nonyl, decyl, dodecyl, tetradecyl, hexadecyl and eicosanyl, or a group of the formula:

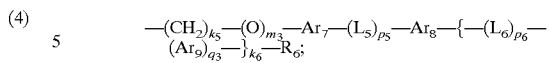

In the above-mentioned formulae including the formulae (1), (2) and (3), k$_1$, k$_3$ and k$_5$ are independently an integer of 2 to 10;

k$_2$, k$_4$, k$_6$, m$_1$, m$_2$, m$_3$, p$_1$, p$_2$, p$_3$, p$_4$, p$_5$, p$_6$, q$_1$, q$_2$, and q$_3$ are independently zero or 1 (wherein 0 means a direct bonding to the adjacent groups);

Ar$_1$, Ar$_2$, Ar$_3$, Ar$_4$, Ar$_5$, Ar$_6$, Ar$_7$, Ar$_8$, and Ar$_9$, are independently a 1,4-phenylene group, a 1,4-cyclohexylene group, a pyridine-2,5-diyl group, or a pyrimidine-2,5-diyl group;

L$_1$, L$_2$, L$_3$, L$_4$, L$_5$, and L$_6$ are independently —CH$_2$—O—, —O—CH$_2$—, —COO—, —OCO—, —CH$_2$—CH$_2$—, —CH=N—, —N=CH—, —N=N—, —N(O)=N— or —N=N (O)—; and R$_2$, R$_5$, and R$_6$ are independently a hydrogen atom, a halogen atom, a cyano group, or a linear or cyclic alkyl group in which each isolated methylene (CH$_2$) group can be replaced by an oxygen atom.

In order to obtain special material properties, for example, to influence the phase separation of the liquid crystalline copolymer in the polymer matrix of the present invention, any additional side groups can be introduced into the copolymer unless the liquid crystalline phase is not spoiled by these additional side groups. Preferred examples of possible side groups include any combination of any one of alkyl groups, alkoxy groups or mesogenic side groups conventionally used in this art.

The molecular weight or the degree of polymerization of the side-chain liquid crystal copolymers is an important factor to determine the state of dispersion. The smaller molecular weight causes no phase separation, whereas the higher molecular weight results in a greater diameter of the liquid crystal domains under the condition of phase separation, which enhances the light scattering and is thus unpractical. The number-average molecular weight of the liquid crystal copolymers preferably used in the present invention, calculated as that of polystyrene, preferably falls in a range of 1,200–10,000, and the mean degree of polymerization of the liquid crystal copolymer used in the present invention is preferably 3 to 30, more preferably 5 to 20.

The liquid crystal copolymer usable in the present invention comprises recurring units of the formulae (6), (7) and (8) with the numbers n$_6$, n$_7$, and n$_8$, of the recurring units (6), (7) and (8), respectively, per molecule of said liquid crystalline copolymer, wherein the ratio of n$_6$/(n$_7$+n$_8$) is in the range of 98/2 to 5/95:

(6)

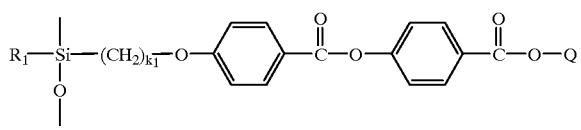

(7)

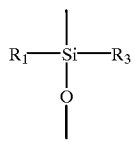

(8)

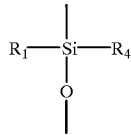

wherein
- —Si—O— constitutes a cyclic or linear chain;
- $R_1$ is an alkyl group containing 1 to 10 carbon atoms including methyl, ethyl, propyl, butyl, pentyl, hexyl, heptyl, octyl, nonyl and decyl, an alkoxy group containing 1 to 10 carbon atoms including methoxy, ethoxy, propyloxy, butoxy, pentyloxy, hexyloxy, heptyloxy, octyloxy, nonyloxy and decyloxy, or a phenyl group;
- Q is a straight-chain alkylene group having 1 to 12 $CH_2$ groups, wherein each isolated, non adjacent $CH_2$ group may be replaced by an oxygen atom, or a cyclohexane group which may be substituted with a $C_1$–$C_3$ alkyl group, e.g. a methyl group, an ethyl group, or a n-propyl group, or a $C_1$–$C_3$ alkoxy group, e.g. a methoxy group, ethoxy group or n-propoxy group at the 4-position;
- $R_3$ is a hydrocarbon group containing 3 to 30 carbon atoms including methyl, ethyl, propyl, butyl, pentyl, hexyl, heptyl, octyl, nonyl, decyl, dodecyl, tetradecyl, hexadecyl and eicosanyl,
- or a 4-(cholesteryloxycarbonylphenyl)oxyalkene group; preferably 4-(cholesteryloxycarbonylphenyl)oxy(1,3-pro, pylen) or (cholesteryloxycarbonylphenyl)oxy(1,4-butylen),

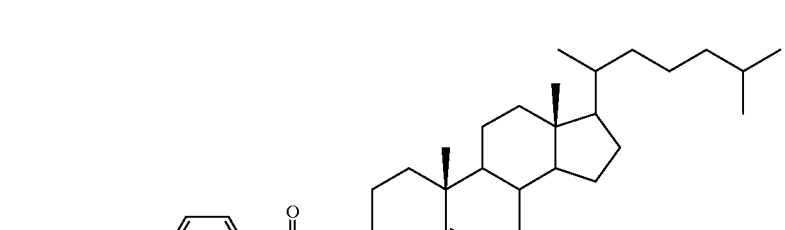

wherein w is 3 or 4,
or a group of the formula;

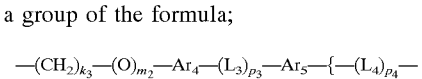

- $R_4$ is a hydrocarbon group containing 3 to 30 carbon atoms including methyl, ethyl, propyl, butyl, pentyl, hexyl, heptyl, octyl, nonyl, decyl, dodecyl, tetradecyl, hexadecyl and eicosanyl,
- or a group of the formula:

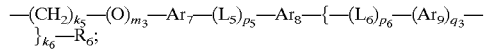

- $K_1$, $k_3$ and $k_5$ are independently integers of 2 to 10;
- $k_4$, $k_6$, $m_2$, $m_3$, $p_3$, $p_4$, $p_5$, $p_6$, $q_2$, and $q_3$ are independently 0 or 1;
- $Ar_4$, $Ar_5$, $Ar_6$, $Ar_7$, $Ar_8$, and $Ar_9$, are independently a 1,4-phenylene group, a 1,4-cyclohexylene group, a pyridine-2,5-diyl group, or a pyrimidine-2,5-diyl group;
- $L_3$, $L_4$, $L_5$, and $L_6$ are independently —$CH_2$—O—, —O—$CH_2$—, —COO—, —OCO—, —$CH_2$—$CH_2$—, —CH=N—, —N=CH—, —N=N—, —N(O)=N— or —N=N (O)—;
- $R_5$, and $R_6$ are independently a hydrogen atom, a halogen atom, a cyano group or a linear or cyclic alkyl group in which each isolated methylene ($CH_2$) group can be replaced by an oxygen atom.

In the present invention, it is also possible to use the mesogenic compound of the formula:

(9)

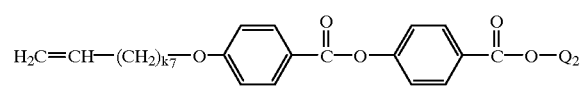

wherein
- $k_7$ is an integer of 0 to 8; and
- $Q_2$ is an alkylene group of straight chains of at least 5 to 12 $CH_2$ groups, wherein each isolated, non adjacent $CH_2$ group may be replaced by an oxygen atom or a cyclohexane group, which may be substituted with a $C_1$–$C_3$ alkyl group, e.g. a methyl group, a ethyl group, or a n-propyl group, or a $C_1$–$C_3$ alkoxy group, e.g., a methoxy group, ethoxy group or n-propoxy group at the 4-position.

The method of synthesizing the liquid crystalline copolymer is not particularly restricted, for instance the methods disclosed in U.S. Pat. Nos. 4,410,570, 4,358,391 and 5,211, 877 are applicable. One available method is to add a side-chain mesogen group and a hydrocarbon group to a polysiloxane chain. The addition of the mesogen group and the hydrocarbon group to the polysiloxane chain can be exemplified by making a compound of the same structure as the side-chain mesogen group of the repeated base unit (1) including an ω-alkenyloxy group, which has an unsaturated double bond at a terminal of alkyleneoxy group functioning as a spacer, and reacting this compound with an α-olefin of the same structure as the side-chain group of the repeated base unit (2) including an unsaturated double bond at a terminal of hydrocarbon group, and a poly(methylhydrosiloxane) in the presence of a platinum catalyst.

The hydrosilylation reaction mentioned below are all performed in the presence of a catalyst. As the catalyst, there can be used transition metals of the platinum group and/or compounds thereof (named hereinafter as platinum catalysts), e.g. platinum, palladium, rhodium, iridium and compounds thereof, which are capable to induce the newly invented syntheses. It is possible to use all the catalysts which are able to catalyze the addition of hydrogen directly bound to silicon atoms to unsaturated aliphatic compounds. Examples of these types of catalysts are metallic platinum finely dispersed on a carrier material such as silicon dioxide, aluminum oxide or activated charcoal, compounds or complexes of platinum, such as platinum halides, for example, $PtCl_4$, $H_2PtCl_6 \cdot 6\ H_2O$, $Na_2PtCl_4 \cdot 4\ H_2O$, platinum-olefin complexes, platinum-alcohol complexes, platinum-alcoholate complexes, platinum-ether complexes, platinum-aldehyde complexes, and platinum-ketone complexes. In addition, reaction products from $H_2PtCl_6 \cdot 6\ H_2O$ and cyclohexanone, platinum-vinylsiloxane complexes, especially platinum-divinyl tetramethyl disiloxane complexes with or without a trace amount of inorganically bound halogen, bis(gamma-picoline)platinum dichloride, trimethylene dipyridine platinum dichloride, dicyclopentadienyl-platinumdichloride, dimethyl sulfoxide ethylen platinum-(II)-dichloride, as well as reaction products of platinum tetrachloride with olefins and primary amines or a secondary amine or a mixture of a primary and a secondary amine, as ell as the reaction product of platinum hexachloride dissolved in 1-octene with sec-butylamine, and platinum ammonia complexes (disclosed in EP-B 110370, U.S. Pat. No. 4,546,164) can be used.

The platinum catalyst as in each case on metallic platinum or the platinum compound can be preferably used in an amount of 0.05 to 0.50 mmol per molar of the corresponding siloxane derivative, which is used as one of the reaction components in a stoichiometric amount or less and which bears at least one hydrogen atom directly bound to a silicon atom.

The reaction is preferably carried out at a temperature of from 0° C. to 110° C., preferably under a pressure of from 0.05 Mpa to 1.0 Mpa.

The reaction is preferably carried out in a solvent, which should in particular be aprotic; solvents or solvent mixtures having a boiling point or boiling range of up to 160° C., in particular up to 120° C., in each case at about 0.1 Mpa, are preferred. Examples of the solvents are esters such as methyl acetate, ethyl acetate, n- and iso-propyl acetate, n-, sec.- and t.-butyl acetate, ethyl formate and diethyl carbonate; ethers such as dioxane, tetrahydrofuran, diethyl ether, di-n-propyl ether, diisopropyl ether, di-n-butyl ether, ethylene glycol monoethyl ether, diethylene glycol dimethyl ether and anisole; chlorinated hydrocarbon such as dichloromethane, trichloromethane, tetrachloromethane, 1,2-dichloroethane, trichloroethane, tetrachloroethylene and chlorobenzene; hydrocarbons such as pentane, n-hexane, hexane isomer mixtures, cyclohexane, heptane, octane, ligroin, petroleum ether, benzene, toluene and xylenes; ketones such as acetone, methyl ethyl ketone and methyl isobutyl ketone; carbon dusulfide, pyridine, acetonitrile and nitrobenzene, or a mixture thereof.

The term solvent does not mean that the reaction components must be soluble therein. The reaction can also be carried out in a suspension or emulsion of one or more reactants. The reaction can be carried out in a solvent mixture with a miscibility gap, in which case at least one rectant is soluble in each of the mixing phases.

The proportions of the repeating units or recurring units of the formulae (1) to (3) included in one molecule of the liquid crystal copolymer of the present invention can be controlled by varying the charging ratio of reaction materials corresponding to the repeating units of the formulae (1) to (3) and thereby regulating the bonding ratio of the groups corresponding to the recurring units (1), (2) and (3).

The liquid crystal copolymer thus obtained is preferably in a liquid crystal phase, more preferably in a nematic phase or a smectic phase, because of its excellent optical anisotropy.

In the present invention, low molecular-weight liquid crystals that can be used together with the side-chain liquid crystal copolymers are those of the formula (10) given below.

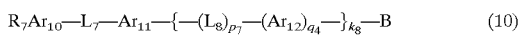
(10)

wherein $R_7$ is an alkyl group having 1 to 6 carbon atoms or an alkoxy group having 1 to 6 carbon atoms;

$Ar_{10}$, $Ar_{11}$ and $Ar_{12}$ are independently a 1,4-phenylene group, a 1,4-cyclohexylene group, a pyridine-2,5-diyl group or a pyrimidine-2,5-diyl group;

$L_7$ and $L_8$ are independently —COO—, —OCO—, —NCH—, —CHN—, —$CH_2$—$CH_2$—, —$CH_2$—O—, —O—$CH_2$—, —N=N—, a single bond (synonymous with direct bond of $Ar_{10}$ and $Ar_{11}$ or $Ar_{11}$ and $Ar_{12}$), —N(O)=N— or —N=N (O)—;

$k_8$, $p_7$ and $q_4$ are independently an integer of 0 or 1; and B is a hydrogen atom, a cyano group, a halogen atom, a $C_{1-6}$ alkyl or alkoxy group, an acrylate group or a methacrylate group.

The liquid crystal homo oligomers or polymers that can be used together with the side-chain liquid crystal copolymer of the present invention include side-chain liquid crystal homo oligomers or polymers and main-chain liquid crystal homo oligomers or polymers. The side-chain liquid crystal homo oligomers or polymers are, however, preferable since the control of the molecular weight is easy and inexpensive.

The side-chain liquid crystal homo oligomers or polymers are expressed by oligomers or polymers which only comprise recurring units of the formula (1), only comprise recurring units of the formula (2) or only comprise recurring units of the formula (6).

The mixing ratio of the side-chain liquid crystal copolymers of the present invention to the other liquid crystals is not particularly restricted but may be appropriately selected to attain a desired temperature range or temperature dependence of retardation or viscosity of the mixture.

In the present invention, the ratio of the liquid crystal compound to the total weight of the liquid crystal compound and the polymer is preferably 0.5% to 50% by weight, more preferably 1% to 30% by weight, and most preferably 1% to 20% by weight. The ratio of less than 0.5% by weight results in almost no appearance of retardation by the liquid crystal compound and thereby lowers the temperature dependence of retardation. The ratio of greater than 50% by weight, on the other hand, makes the mechanical stability of the resulting film undesirably small. The ratio of the liquid crystal compound to the polymer is appropriately selected from the above range, in order to attain the desired mechanical stability of a resulting film and temperature dependence of retardation.

In the optically anisotropic film of the present invention, it is preferable that the liquid crystal compound is phase separated from the polymer matrix and forms a domain.

The orientation of the liquid crystal compound can be controlled by the shape of the domain. For example, when the domain is a spheroidal body in shape, the liquid crystal copolymer and/or liquid crystal is uniaxially oriented. In the case of an ellipse having three axes of different lengths, the liquid crystal is biaxially oriented. The shape of the domain can effectively be controlled by a stretching process mentioned below.

The upper limit of the domain diameter is restricted by light scattering, whereas the lower limit of the domain diameter is restricted by the orientation of the liquid crystal. The diameter of the domain can be defined by the length of the main axis of the domain. The mean length of the main axis of the domain is preferably 20 nm to 600 nm, more preferably 30 nm to 400 nm.

The mean length of the main axis of the domain is determined by observing the optically anisotropic film with a transmission electron microscope (hereinafter referred to as "TEM"), directly measuring the diameters of the respective particles, and calculating the number-average particle diameter.

Now, the matrix polymers used for the optically anisotropic films in the first and second embodiments of the present invention are explained.

The polymers used as the matrix in the present invention are preferably those which show no change of optical properties or shape at the working temperature or at the temperature laminating to the LCD cell process. Preferred examples of such polymers are thermoplastic engineering polymers having a relatively high glass transition temperature, and plasticizer loaded polymers having a comparatively high flow temperature.

Regarding the glass transition temperature or softening temperature of the matrix polymer, its lower limit is decided so that no change of optical properties or no deformation such as shrinkage of the film will be occur within the working temperature range of the liquid crystal displays. The upper limit is decided in view of the fact that since the polymer when molded into a film needs to be stretched under heating, too high glass transition temperature is undesirable in industrial production. The preferred range of glass transition temperature or softening temperature of the matrix is 80° C. to 250° C., more preferably 90° C. to 200° C.

Examples of the polymers which satisfy these conditions for use in the present invention include polycarbonates, polysulfones, polyarylates, polyethersulfones, cellulose diacetate, cellulose, triacetate, polyethylene terephthalate and polyethylene naphthalate. Of these polymers, polycarbonates, polyarylates, polysulfones, cellulose triacetate and polyethylene terephthalate are preferred.

In the present invention, the polymers which cause only limited birefringence in the optically anisotropic film can also be preferably used as the matrix polymer. Generally, the birefringence Δn by the polymer orientation is given by the following equation:

$$\Delta n = \Delta n_0 f \quad (C)$$

wherein $\Delta n_0$ is interinsic birefringence of the polymer and f is an orientational order parameter.

For reducing the birefringence of the polymer, there can be employed, for instance, a method using a polymer with small intrinsic birefringence, a method in which a polymer with positive intrinsic birefringence and a polymer with negative intrinsic birefringence are mixed to reduce apparent intrinsic birefringence, and a method in which the orientational order parameter is lessened.

An additive or additives may be contained in the matrix polymer for the purpose of affording mechanical strength to the polymer or for improving adhesiveness to the LCD panel when the produced film is bonded thereto. The type and amount of such additive (s) may be properly decided within limits nor damaging the objhect of the present invention.

A process for producing the optically anisotropic film of the present invention is described below.

Mixing of at least one liquid crystal compound and a polymer is preferably carried out in a state of solution in view of homogeneity of mixing. Typically, a liquid crystal compound is suspended or dissolved in a solvent and then a polymer is suspended or dissolved in the solution. It is preferable to use a solvent having a high solubility.

Various methods are available for forming a film from the mixture of liquid crystal compound and matrix polymer. For example, there can be used a solvent casting methyod in which the liquid crystal compound and matrix polymer are dissolved in a solvent and cast; an extrusion molding method in which said both materials are mixed in a solid state and extruded from a die to form a film; a calender roll method in which the materials are mixed in a solid state and calender rolled into a film, a press molding method using a press for forming a film. The casting method is preferred because of excellent film thickness precision. The film thickness is not specifically limited, but it is preferable in a range of 20 μm to 300 μm, more preferably 70 μm to 120 μm.

Uniaxial stretching of the film under heating can be accomplished by tentering, stretching between rolls, roll compression stretching or other means. Tentering or stretching between rolls is preferred for uniformity of the film surface. The method of heating of the film in the stretching operation is not subject to any specific restrictions. The heating temperature is properly selected in consideration of the transition temperatures of the matrix polymer and liquid crystal used, the temperature dependence of the retardation of the optically anisotropic film and other factors, but preferably higher than the working temperature of the liquid display device, specifically 90° C. or above. As for the film stretch factor, a too low stretch further results in an unsatisfactory alignment of the liquid crystal while a too high stretch factor leads to a poor productivity, so that it is preferably in a range of 1.01–8 times, more preferably 1.1–6 times. The stretching speed and cooling speed may be properly decided. The film is preferably heat treated before and/or after stretching, more preferably heat treated after stretching. The heat treatment temperature, heat treatment time and heat treatment method are not subject to any specific restrictions.

The optically anisotropic films according to the present invention may be provided with a conventional transparent hard coat or gas barrier layer on one or both sides of the film for the purposes of surface protection and improvement of adhesion by an adhesive.

The liquid crystal display devices provided according to the present invention comprise a liquid crystal display cell, at least one optically anisotropic film and at least one polarizing film according to a conventional arrangement. In the case of an STN type liquid crystal display device for instance, the liquid crystal display cell may be one which is composed of low-molecular weight liquid crystals having twisted nematic alignment with a twist angle of 180° C. to 360° C. and which is held between the substrates having transparent electrodes.

In the liquid crystal display devices according to the present invention, the location and the number of the optically anisotropic films to be used are not particularly limited; said film(s) may be provided an any desired location as far as it is positioned between the polarizing film and the liquid crystal display cell. As for the alignment angles of the absorption axis of the polarizer or the rubbing direction of the liquid crystal display cell, the alignment angle of the stretching axis of the optically anisotropic film is selected to provide an optimal contrast or viewing angle characteristics of the liquid crystal device.

The present invention is further illustrated by way of the following Examples, but not restricted to these Examples. In the Examples, the glass transition temperature, the retardation and the temperature dependence of retardation were measured as follows.

The glass transition temperature (Tg) of the liquid crystal copolymer and the transition temperature (Ti) of the liquid crystal phase to the isotropic phase were measured with a differential scanning calorimeter (DSC). A linear differential peak of an endothermic curve at the time of an increase in temperature was regarded as Tg, while an endothermic peak by the liquid crystal phase-isotropic phase transition was regarded as Ti.

The retardation of the resulting optically anisotropic film was measured with a polarizing microscope (OPTIPHOTO2-POL manufactured by NIKON CORP.) according to the Sénarmont method. The wavelength of the light for measurement was 546 nm.

The temperature dependence of retardation was determined by measuring the retardation while cooling the resulting optically anisotropic film with a hot stage connected to a cooling unit (trade name: FP82 hot stage manufactured by Mettler Corp.).

EXAMPLE 1

4-(2-Propenyloxy)benbzoic acid (4'-methoxyphenyl)ester in an amount of 44.9 g (a compound disclosed in U.S. Pat. No. 4,399,435) was dissolved in 400 ml of toluene. After distilling off 10% of the solvent, 15.0 g of a linear polymethylsiloxane (average molecular weight 901 g/mol, available from Wacker Chemie GmbH, München, Germany) and subsequently 400 μl of a 1% solution of a platinum catalyst in methylene chloride were added to the toluene solution at 75° C. The reaction mixture was heated to 100° C. and stirred for 90 minutes at the same temperature. After cooling the mixture to 75° C., 4.0 g of 1-hexene and additional 50 μl of the platinum catalyst solution were added. The reaction mixture was stirred for another 1 hour at 100° C., subsequently cooled to room temperature and then filtered. The desired product precipitated out of the reaction mixture after the addition of n-pentane. A liquid crystal copolymer 1 in an amount of 46.2 g was obtained after evaporation of the remaining solvent under reduced pressure. The liquid crystal compound had an average molecular weight of 5140 (Mn), a molecular weight distribution of 1.35 (Mw/Mn) and contained 1.3% of monomers. Its phase transition temperatures measured by differential scanning calorimetry were Tg=13° C. and Ti=45° C.

The liquid crystal copolymer 1 and a polycarbonate (trade name: Panlite C1400 manufactured by TEIJIN LTD.) were mixed at a weight ratio of 6 to 94, and the mixture was then dissolved in methylene chloride to have the solid concentration of 20% by weight. The resulting solution was cast on a glass plate with an application of 500 μm in gap to yield a film.

The resulting cast film was stretched at 175° C. 1.5 times in order to obtain an optically anisotropic film. Retardations of the optically anisotropic film at 80, 60, 30, and 0° C. were respectively 347, 347, 473, and 527 nm, and the retardations at 80, 60, and 0° C. were 74, 74, and 111% of the retardation at 30° C.

The retardation by the liquid crystal measured immediately after the two-hours' heat treatment of the optically anisotropic film at 85° C. was 119 nm. The retardation by the liquid crystal measured 200 hours after the heat treatment was 116 nm, which corresponds to a 2.6% variation from the retardation immediately afer the heat treatment.

The resulting optically anisotropic film is mounted on an STN liquid crystal display apparatus to enable black and white display in a temperature range of 0 to 40° C.

EXAMPLE 2

A liquid crystal represented by the formula (11) given below and the liquid crystal copolymer 1 obtained in Example 1 were mixed at a weight ratio of 1 to 1. The phase transition temperature of the mixture was measured with the DSC. An endothermic peak corresponding to the transition temperature of the liquid crystal phase to the isotropic phase of the mixture was observed at 89° C.

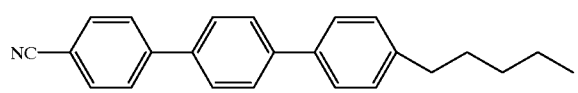

(11)

The liquid crystal copolymer 1, the liquid crystal of the formula (11), and PC were mixed at a weight ratio of 5 to 5 to 90, and the mixture was then dissolved in methylene chloride to have the solid concentration of 20% by weight. The resulting solution was cast on a glass plate to yield a film.

The resulting cast film was stretched at 160° C. 1.5 times in order to obtain an optically anisotropic film. Retardations of the optically anisotropic film at 80, 60, and 30° C. were respectively 387, 493, and 554 nm, and th retardations at 80° C. and 60° C. were 70% and 89% of the retardation at 30° C.

The retardation by the liquid crystal measured immediately after the two-hours' heat treatment of the optically anisotropic film at 100° C. was 155 nm. The retardation by the liquid crystal measured 200 hours after the heat treatment was 162 nm, which corresponds to a 4.9% variation from the retardation immediately after the heat treatment.

The resulting optically anisotropic film is mounted on an STN liquid crystal display apparatus to enable black and white display in a temperature range of 30° C. to 80° C.

EXAMPLE 3

A liquid crystal mixture E9 (manufactured by BDH CORP.) and the liquid crystal copolymer 1 specified in Example 1 were mixed at a weight ratio of 1 to 1.

The liquid crystal copolymer 1, E9, and PC were mixed at a weight ratio of 7:7:86, and the mixture was then dissolved in methylene chloride to have the solid concentration of 20% by weight. The resulting solution was cast on a glass plate to yield a film.

The resulting cast film was stretched at 150° C. 1.5 times in order to obtain an optically anisotropic film. Retardations of the optically anisotropic film at 80, 60, 30, and 0° C. were respectively 196, 239, 484, and 541 nm, and the retardations at 80, 60, and 0° C. were 40, 49, and 112% of the retardation at 30° C.

The retardation by the liquid crystal measured immediately after the two-hours' heat treatment of the optically anisotropic film at 100° C. was 275 nm. The retardation by the liquid crystal measured 200 hours after the heat treatment was 281 nm, which corresponds to a 2.1% variation from the retardation immediately after the heat treatment.

The resulting optically anisotropic film is mounted on an STN liquid crystal display apparatus to enable black and white display in a temperature range of 0° C. to 80° C.

Comparative Example 1

117 g of 4-(2-propenyloxy)benzoic acid (4'-methoxypyhenyl)ester was dissolved in 960 ml of toluene. After distilling off 10% of the solvent, 30.0 g of a linear polymethylsiloxane with an average molecular weight of 1004 g/mol (available from Wacker Chemie GmbH, München, Germany) and subsequently 1.7 g of a 1% solution of a platinum catalyst in methylene chloride were added to this solution at 70° C. The reaction mixture was stirred for two hours at 90° C. After cooling down to room temperature, the mixture was filtered. The desired product precipitated out of the reaction mixture after the addition of n-pentane. 21.2 g of a liquid crystal to polymer 2 were obtained after evaporation of the remaining solvent under reduced pressure. The liquid crystal copolymers had an average molecular weight of 5200 (Mn), a molecular weight distribution of 1.38 (Mw/Mn) and contained 1.0% of monomer. Its phase transition temperatures measured by differential scanning calorimetry were Tg=23° C. and Ti=71° C.

The liquid crystal copolymer 2 and the polycarbonate (trade name: Panlite C1400 manufactured by TEIJIN LTD.) were mixed at a weight ratio of 7 to 93, and the mixture was then dissolved in methylene chloride to have the solid concentration of 20% by weight. The resulting solution was cast on a glass plate with an application of 500 μm in gap to yield a film.

The resulting cast film was stretched at 175° C. 1.5 times in order to obtain an optically anisotropic film. The retardation of the optically anisotropic film was 498 nm at 30° C.

The retardation of the optically anisotropic film was 314 nm at 80° C., which corresponds to 63% of the retardation at 30° C.

The retardation by the liquid crystal measured immediately after the two-hour heat treatment of the optically anisotropic film at 85° C. was 160 nm. The retardation by the liquid crystal measured 200 hours after the heat treatment was 181 nm, which corresponds to a 13% variation from the retardation immediately after the heat treatment.

EXAMPLE 4

31.5 g 4-(2-propenyloxy)benzoyloxy-4-(4'-methoxybenzoyl)phenylester, 27.7 g 4-(2-propenyloxy) benzoic acid [4-(butoxycarbonyl)phenyl]ester (syntehsised according to G.-P. Chang Chien, J.-F. Kuo, C.-Y, Chen in J. Polym. Sci. A, 1993, 31, 2432–2436) and 12.2 g of a linear polymethylsiloxane with an average molecular weight of 738 g/mol were dissolved in 400 ml of dry toluene. After heating the solution to 75° C., 1.53 g of a 1% solution of a platinum catalyst in methylene chloride was added. Subsequently, the reaction mixture was heated to 100° C. and stirred for 3 hours at this temperature. After cooling to room temperature, the solution was poured into n-pentane and the precipitated product was filtered off. After the remaining solvent was evaporated under reduced pressure, 49.1 g of a liquid crystal copolymer 3 was obtained. The material had an average molecular weight of 5200 (Mn), a molecular weight distribution of 1.32 (Mw/Mn), and a monomer content of 4.5%. Its phase transition temperatures measured by differential scanning calorimetry were Tg=16° C. and Ti=135° C.

The liquid crystal copolymer 3 and a polycarbonate (C1400) were mixed at a weight ratio of 7 to 93, and the mixture was then dissolved in methylene chloride to have the solid concentration of 20% by wedight. The resulting solution was cast on a glass plate with an applicator of 680 μm in gap to yield a film of 100 μm thick after drying.

The resulting cast film was stretched at 175° C. 1.5 times in length to obtain an optically anisotropic film. Retardations of this film at 120, 80, 60 and 30° C. were respectively 275, 394, 429 and 460 nm, and the retardations at 120, 80 and 60° C. were 60, 86, and 93% of the retardation measured at 30° C.

The retardation by the liquid crystal at 30° C. measured immediately after the two-hours' heat treatment of the optically anisotropic film at 85° C. was 240 nm. The retardation by the liquid crystal at 30° C. measured 200 hours after the heat treatment was 235 nm, which corresponds to a 2% variation from the retardation immediately after the heat treatment.

EXAMPLE 5

25.2 g of 4-(2-propenyloxy)benzoyloxy-4-(4'-methoxybenzoyl)phenylester, 22.1 g 4-(2-propenyloxy) benzoic acid [4-(butoxycarbonyl)phenyl]ester, 2.63 g of 1-hexene and 12.2 g of a linear polymethylsiloxane with an average molecular weight of 738 g/mol (available from Wacker Chemic GmbH, München, (Germany) were dissolved in 400 ml of dry toluene. The reaction mixture was heated to 75° C. and 1.53 g of a 1% solution of a platinum catalyst in methylene chloride was added. Subsequently, the mixture was heated to 100° C. and stirred for 3 hours at this temperature. After cooling to room temperature, the mixture was filtered and the clear solution was poured into n-pentane. The precipitated product was filtered off and dried in vacuo. 30.3 g of a liquid crystal copolymer 4 was obtained. Its average molecular weight was 5000 (Mn) with a molecular weight distribution of 1.33 (Mw/Mn) and a monomer content of 3%. Its phase transition temperatures measured by differential scanning calorimetry were Tg=11° C. and Ti=108° C.

The liquid crystal copolymer 4 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 μnm in gap to yield a film of 100 μm thick after drying.

The resulting cast film was stretched at 175° C. 1.5 times in length to obtain an optically anisotropic film. Retardations of this film at 120, 80, 60 and 30° C. were respectively 549, 801, 868 and 931 nm, and the retardations at 120, 80 and 60° C. were 59, 86, and 93% of the retardation measured at 30° C.

The retardation by the liquid crystal at 30° C. measured immediately after the two-hours' heat treatment of the optically anisotropic film at 85° C. was 380 nm. The retardation by the liquid crystal at 30° C. measured 200 hours after the heat treatment was 269 nm, which corresponds to a 3% variation from the retardation immediately after the heat treatment.

EXAMLE 6

15.8 g of 4-(2-propenyloxy)benzoyloxy-4-(4'-methoxybenzoyl)phenylester, 41.5 g 4-(2-propenyloxy)

benzoic acid [4-(butoxycarbonyl)phenyl]ester and 12.2 g of a linear polymethylsiloxane with an average molecular weight of 738 g/mol were dissolved in 400 ml of dry toluene. The solution was heated to 75° C. and 1.53 g of a 1% solution of a platinum catalyst in methylene chloride was added. Subsequently, the reaction mixture was heated to 100° C. and stirred for 3 hours at this temperature. After cooling to room temperature, the solution was poured into n-pentane and the precipitated product was filtered off. After the remaining solvent traces were evaporated under reduced pressure, 49.1 g of the liquid crystal copolymer 5 was obtained. The material had an average molecular weight of 5300 (Mn), a molecular weight distribution of 1.30 (Mw/Mn) and a monomer content of 3%. Its phase transition temperatures measured by differential scanning calorimetry were Tg=6° C. and Ti=68° C.

The liquid crystal copolymer 5 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film. Retardations of this film at 80, 60, 30 and 20° C. were respectively 385, 539, 741 and 765 nm, and the retardations at 80, 60 and 20° C. were 52, 79, and 103% of the retardation measured at 30° C.

The retardation by the liquid crystal at 30° C. measured immediately after the two-hours' heat treatment of the optically anisotropic film at 85° C. was 376 nm. The retardation by the liquid crystal at 30° C. measured 200 hours after the heat treatment was 380 nm, which corresponds to a 1% variation from the retardation immediately after the heat treatment.

EXAMPLE 7

18.9 g of 4-(2-propenyloxy)benzoyloxy-4-(4'-methoxybenzoyl)phenylester, 38.7 g 4-(2-propenyloxy) bebnzoic acid [4-(butoxycarbonyl)phenyl]ester and 12.2 g of linear polymethylsiloxane with an average molecular weight of 738 g/mol were dissolved in 400 ml of dry toluene. The solution was heated to 75° C. and 1.53 g of a 1% solution of a platinum catalyst in methylene chloride was added. Subsequently, the reaction mixture was heated to 100° C. and stirred for 3 hours at this temperature. After cooling to room temperature, the solution was poured into n-pentane and the precipitated product was filtered off. After the remaining solvent was evaporated under reduced pressure, 49.7 g of the liquid crystal copolymer 6 was obtained. The material had an average molecular weight of 5300 (Mn), a molecular weight distribution of 1.30 (Mw/Mn) and a monomer content of 3%. Its phase transition temperatures measured by differential scanning calorimetry were Tg=7° C. and Ti=83° C.

The liquid crystalline copolymer 6 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film. Retardations of this film at 100, 80, 60, 30 and 20° C. were respectively 482, 580, 805, 900 and 918 nm, and the retardation at 100, 80, 60 and 20° C. were 53, 64, 89, and 102% of the retardation measured at 30° C.

The retardation by the liquid crystal at 30° C. measured immediately after the two-hours' heat treatment of the optically anisotropic film at 85° C. was 436 nm. The retardation by the liquid crystal at 30° C. measured 200 hours after the heat treatment was 437 nm, which corresponds to less than 1% variation from the retardation immediately after the heat treatment.

EXAMPLE 8

4.45 g 4-(2-propenyloxy)benzoyloxy-4-(4'-methoxybenzoyl)phenylester, 9.10 g 4-(2-propenyloxy)-benzoic acid [4-(butoxycarbonyl)phenyl]ester and 3.06 g a linear polymethylsiloxane with an average molecular weight of 608 g/mol (available from Wacker Chemie GmbH, München Germany) were dissolved in 80 ml of dry toluene. The solution was heated to 75° C. and 0.15 g of a 1% solution of a platinum catalyst in methylene chloride was added. Subsequently, the reaction mixture was heated to 100° C. and stirred for 3 hours at this temperature. After cooling to room temperature, the solution was poured into n-pentane and the precipitated product was filtered off. After the remaining solvent was evaporated under reduced pressure, 7.75 g of the liquid crystal copolymer 7 was obtained. The material had an agverage molecular weight of 4500 (Mn), a molecular weight distribution of 1.25 (Mw/Mn) and a monomer content of 1%. Its phase transition temperatures measured by differential scanning calorimetry were Tg=7° C. and Ti=74° C.

The liquid crystal copolymer 7 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film. Retardations of this film at 80, 60, 30 and 20° C. were respectively 232, 450, 557 and 578 nm, and the retardations at 80, 60, and 20° C. were 42, 81, and 104% of the retardation measured at 30° C.

The retardation by the liquid crystal at 30° C. measured immediately after the two-hours' heat treatment of the optically anisotropic film at 85° C. was 330 nm. The retardation by the liquid crystal at 30° C. measured 200 hours after the heat treatment was 331 nm, which corresponds to less than 1% variation from the retardation immediately after the heat treatment.

EXAMPLE 9

100 g (0.42 mol) of the heptyl ester of 4-hydroxynenzoic acid (available from Avocado, GB-LA 32XY Heysham) was dissolved in 300 ml of toluene. After the addition of 83.2 g (0.42 mol, one equivalent) 4-propenyloxy benzoic acid chloride, the reaction mixture was heated to 60° C. under stirring. A solution of 48.7 g (0.48 mol) of triethylamine dissolved in 70 ml of toluene was added within 45 minutes to the reaction mixture. Subsequently, the latter was stirred for additional 3 hours at 90° C. After cooling to room temperaure, the precipitated triethylamine hydrochloride complex was filtered off. The filtered solution was washed thoroughly first with water, then twice with dilute hydrochloric acid (2 N). After the solution was dried over sodium sulphate, the solvent was partly removed. The crude product was recrystallized from isopropanol, leading to 147 g (yield: 88%) of a colorless, crystalline material, melting point (m.p) 41–45° C. The compound showed a nematic phase when cooled between 41 and 33° C.

In the same manner, the following homologous esters were prepared:

(2-propenyloxy)benzoic acid [4-(propyloxy-carbonyl) phenyl)]ester with the following phase transitions: melting point 65–70° C., showed a nematic phase when cooled between 48° and 45° C., (2-propenyloxy)benzoic acid [4-(pentyloxycarbonyl) phenyl]ester, m.p. 39–57° C., (2-propenyloxy)benzoic acid [4-(hexyloxycarbonyl) phenyl]ester, m.p. 50–54° C., (2-propenyloxy)benzoic acid [4-(octyloxycarbonyl) phenyl]ester, m.p. 42–49° C., (2-propenyloxy)benzoic acid [4-(dodecyloxycarbonyl) phenyl]ester, m.p. 58–65° C.

EXAMPLE 10

3.54 g of 4-(2-propenyloxy)benzoyloxy-4-(4'-methoxybenzoyl)phenylester. 10.4 g 4-(2-propenyloxy) benbzoic acid [4-(heptoxycarbonyl)phenyl]ester and 2.7 g a linear polymethylsiloxane with an average molecular weight of 786 g/mol were dissolved in 80 ml of dry toluene. The reaction mixture was heated to 75° C., and 0.15 g of a 1% solution of a platinum catalyst in methylene chloride was added. Subsequently, the mixture was heated to 100° C. and stirred for 3 hours at this temperature. After cooling to room temperature, the mixture was filtered and the clear solution was poured into n-pentane. The precipitated product was filtered off and dried in vacuo. 8.2 g of a liquid crystal copolymers 8 was obtained. Its average molecular weight was 6300 (Mn) with a molecular weight distribution of 1.29 (Mw/Mn) and a monomer content of 3%. Its phase transition temperatures measured by differential scanning calorimetry were Tg=–1° C. and Ti=–62° C.

The liquid crystal copolymer 8 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film. Retardations of this film at 80, 60, 30 and –10° C. were respectively 529, 545, 978 and 1083 nm, and the retardations at 80, 60 and –10° C. were 54, 56, and 111% of the retardation measured at 30° C.

The retardation by the liquid crystal at 30° C. measured immediately after the two-hours' heat treatment of the optically anisotropic film at 85 C. was 450 nm. The retardation by the liquid crystal at 30° C. measured 200 hours after the heat treatment was 451 nm, which corresponds to less than 1% variation from the retardation immediately after the heat treatment.

EXAMPLE 11

4.33 g of 4-(2-propenyloxy)benzoyloxy-4-(4'-methoxybenzoyl)phenylester, 10.1 g, 4-(2-propenyloxy) benzoic acid [4- (octyloxycarbonyl)phenyl]ester and 2.7 g of a linear polymethylsiloxane with an average molecular weight of 786 g/mol were dissolved in 80 ml of dry toluene. The reaction mixture was heated to 75° C., and 0.15 g of a 1% solution of a platinum catalyst in methylene chloride was added. Subsequently, the mixture was heated to 100° C. and stirred for 3 hours at this temperature. After cooling to room temperature, the mixture was filtered and the clear solution was poured into n-pentane. The precipitated prod-uct was filtered off and dried in vacuo. 7.9 g of a liquid crystal copolymer 9 was obtained. Its average molecular weight was 6550 (Mn) with a molecular weight distribution of 1.27 (Mw/Mn) and a monomer content of 3.8%. Its phase transition temperatures measured by differential scanning calorimetry were Tg=2° C. and Ti=80° C.

The liquid crystal copolymer 9 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film.

Retardations of this film at 80, 60, 30 and 20° C. were respectively 391, 747, 893 and 906 nm, and the retardations at 80, 60 and 20° C. were 44.84, and 101% of the retardation measured at 30° C.

The retardation by the liquid crystal at 30° C. measured immediately after the two-hours' heat treatment of the optically anisotropic film at 85° C. was 520 nm. The retardation by the liquid crystal at 30° C. measured 200 hours after the heat treatment was 521 nm, which corresponds to less than 1% variation from the retardation immediately after the heat treatment.

EXAMPLE 12

36.0 g 4-(2-propenyloxy)bebnzoic acid (4'-methoxyphenyl)ester (a compound disclosed in U.S. Pat. No. 4,399,435), 17.3 g of cholest-5-en-3-ol(3β)-, 4-(2-propenyloxy)bebnzoate (EP 0358208, U.S. Pat. No. 5,211, 877), 1.48 g of 1-hexene and 2.7 g of a linear polymethylsiloxane with an average molecular weight of 738 g/mol were dissolved in 400 ml of dry toluene. The solution was placed in a reaction vessel and warmed up to 75–80° C. The reaction mixture was heated to 75° C., and 1.53 g of a 1% solution of a platinum catalyst in methylene chloride was added. Subsequently, the mixture was heated to 100° C. and stirred for 3 hours at this temperature. After cooling to room temperature, the mixture was filtered and the clear solution was poured into n-pentane. The precipitated product was filtered off and dried in vacuo. 18.7 g of a liquid crystal copolymer 10 was obtained. Its average molecular weight was 5000 (Mn) with a molecular weight distribution of 1.4 (Mw/Mn) and a monomer content of 3.7%. Its phase transition temperatures measured by differential scanning calorimetry were Tg=19° C. and Ti=87° C.

The liquid crystal copolymer 10 and a polycarbonate (C1400) were mixed at a weight ratio of 7 to 93, and the mixture was then dissolved in methylene chloride to have the solid concentration of 20% by weight. The resulting solution was cast on a glass plate with an applicator of 680 µm in gap to yield a film of 100 µm thick after drying.

The resulting cast film was stretched at 175° C. 1.5 times in length to obtain an optically anisotropic film. Retardations of this film at 100, 80, 60, and 30° C. were respectively 548, 638, 683 and 696 nm, and the retardations are 100, 80 and 60° C. were 79, 92, and 98% of the retardation measured at 30° C.

The retardation by the liquid crystal at 30° C. measured immediately after the two-hours' heat treatment of the optically anisotropic film at 85° C. was 150 mn. The retardation by the liquid crystal at 30° C. measured 200 hours after the heat treatment was 149 nm, which corresponds to less than 1% variation from the retardation immediately after the heat treatment.

EXAMPLE 13

The liquid crystalline precursors described in Example 8 and a linear polymethylsiloxane having different average molecular weight were used. A liquid crystal copolymer 11 was obtained. Its average molecular weight was 3800 (Mn) with a molecular weight distribution of 1.25 (Mw/Mn) and a monomer content of 6.6%. Its phase transition temperatures measured by DSC were Tg=0° C. and Ti=56° C.

The liquid crystal copolymer 11, the liquid crystal material represented by the formula (11) used in Example 2 and a polycarbonate (C1400) were mixed at a weight ratio of 6:1:93, and the mixture was then dissolved in methylene chloride to have the solid concentration of 20% by weight. The resulting solution was cast on a PET foil.

The resulting cast film was stretched at 175° C. 1.5 times in length to obtain an optically anisotropic film. The stretched film was heat treated at 110° C. for 60 minutes. Retardations of this film at 80 and 30° C. were respectively 345.8 and 402.8 nm, and the retardation at 80° C. was 85.8% of the retardation measured at 30° C.

The retardation by the liquid crystal at 30° C. measured immediately after the heat treatment of the optically anisotropic film was 57.0 nm. The retardation by the liquid crystal at 30° C. measured 200 hours after the heat treatment was 58.9 nm, which corresponds to 3.3% variation from the retardation immediately after the heat treatment.

EXAMPLE 14

An optically anisotropic film was obtained in the same preparation method as described in Example 13. The optically anisotropic film was heat treated at 120° C. for 20 minutes. Retardations of this film at 80 and 30° C. were respectively 309.7 and 366.4 nm, and the retardation at 80° C. was 84.5% of the retardation measured at 30° C.

The retardation by the liquid crystal at 30° C. measured immediately after the heat treatment of the optically anisotropic film was 56.7 nm. The retardation by the liquid crystal at 30° C. measured 200 hours after the heat treatment was 59.8 nm, which corresponds to 5.5% variation from the retardation immediately after the heat treatment.

As optically anisotropic film was obtained in the same manner as mentioned above. The optically anisotropic film was heat treated at 120° C. for 20 minutes. Retardation of this film at 80° C. and 30° C. were respectively 274.2 and 320.6 nm, and the retardation at 80° C. was 85.5% of the retardation measured at 30° C. The retardation by the liquid crystal at 30° C. measured immediately after the heat treatment of the optical anisotropic film was 46.4 nm. The retardation by the liquid crystal at 30° C. measured 200 hours after a heat treatment at 100° C. was 48.8 nm, which corresponds to 5.1% variation from the retardation immediately after the former heat treatment.

As mentioned above, the optically anisotropic film of the present invention kepts the temperature dependence that can respond to the temperature dependence of retardation of a liquid crystal display cell used in combination, and has a little variation of the properties with the lapse of time. The optically anisotropic film is favorably applied to a liquid crystal display apparatus, especially to an STN liquid crystal display apparatus or an ECB liquid crystal display apparatus. This is industrially advantageous since the resulting liquid crystal display apparatus has excellent display properties at temperatures lower than room temperature.

What is claimed is:

1. A transparent or semi-transparent optically anisotropic film obtained from a mixture comprising at least a polymer and a liquid crystal compound, wherein retardation of said optically anisotropic film at 80° C. measured from a normal direction is 20% to 97% of retardation at 30° C., and an absolute value of a variation in retardation by said liquid crystal compound is not greater than 6% when said optically anisotropic film is held at 30° C. for 200 hours, said retardation being measured at a wavelength of 546 nm.

2. A transparent or semi-transparent optically anisotropic film obtained from a mixture comprising a polymer and a liquid crystal compound, wherein retardation of said optically anisotropic film at 60° C. measured from a normal direction is 20% to 99% of retardation at 30° C., and an absolute value of a variation in retardation by said liquid crystal compound is not greater than 6% when said optically anisotropic film is held at 30° C. for 200 hours, said retardation being measured at a wavelength of 546 nm.

3. A transparent or semi-transparent optically anisotropic film obtained from a mixture comprising a polymer and a liquid crystal compound, wherein retardation of said optically anisotropic film at 0° C. measured from a normal direction is 101% to 150% of retardation at 30° C., and an absolute value of a variation in retardation by said liquid crystal compound is not greater than 6% when said optically anisotropic film is held at 30° C. to 200 hours, said retardation being measured at a wavelength of 546 nm.

4. An optically anisotropic film according to claim 1, wherein said optically anisotropic film has retardation at 60° C. measured from the normal direction of 20% to 99% compared with the retardation at 30° C., said retardation being measured at the wavelength of 546 nm.

5. An optically anisotropic film according to claim 4, wherein said optically anisotropic film has retardation at 0° C. measured from the normal direction of 101% to 150% compared with the retardation at 30° C., said retardation being measured at the wavelength of 546 nm.

6. An optically anisotropic film according to claim 2, wherein said optically anisotropic film has retardation at 0° C. measured from the normal direction of 101% to 150% compared with the retardation at 30° C., said retardation being measured at the wavelength of 546 mn.

7. An optically anisotropic film according to claim 1, wherein said liquid crystal compound comprises a liquid crystal copolymer comprising recurring units of the formulae (1), (2) and (3) with the numbers $n_1$, $n_2$, and $n_3$ of the recurring units (1), (2) and (3), respectively, wherein the ratio of $n_1$ to $(n_2+n_3)$ is in a range of 98/2 to 20/80 per molecule on average, and a ratio of $n_2$ to $n_3$ is in a range of 100/0 to 20/80 per molecule on average;

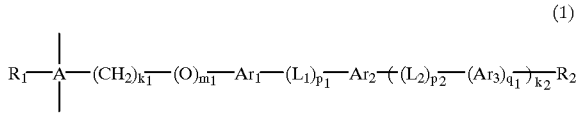

(1)

(2)

(3)

wherein A in the formulae (1) (2) and (3) is a group of the formulae (4) or (5), (4)

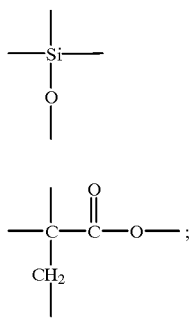

(5)

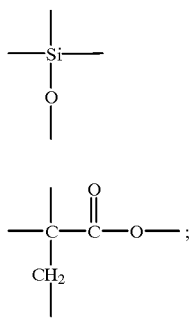

—Si—O— in the formula (4) is a cyclic or linear main chain of the formulae (1), (2) and (3);

—C—CH$_2$— in the formula (5) is a main chain of the formulae (1), (2) and (3), and —COO— group in the formula (5) is bonded to (CH$_2$)k$_1$ group of the formula (1) and to R$_3$ group of the formula (2), and to R$_4$ group of the formula (3);

when A is the formula (5), in the formulae (1), (2) and (3), R$_1$ is an alkyl group containing 1 to 6 carbon atoms or an alkoxy group containing 1 to 6 carbon atoms;

when A is the formula (4) in the formulae (1), (2) and (3), R$_1$ is an alkyl group containing 1 to 10 carbon atoms, an alkoxy group containing 1 to 10 carbon atoms, or a phenyl group;

R$_3$ is a hydrocarbon group containing 3 to 30 carbon atoms, a 4-(cholesteryloxycarbonylphenyl)oxyalkene, or a group of the formula:

—(CH$_2$)$_{k_3}$—(O)$_{m_2}$—Ar$_4$—(L$_3$)$_{p_3}$—Ar$_5$—{—(L$_4$)$_{p_4}$—(Ar$_6$)$_{q_2}$—}$_{k_4}$—R$_5$;

R$_4$ is a hydrocarbon group containing 3 to 30 carbon atoms, or a group of the formula:

—(CH$_2$)$_{k_5}$—(O)$_{m_3}$—Ar$_7$—(L$_5$)$_{p_5}$—Ar$_8$—{—(L$_6$)$_{p_6}$—(Ar$_9$)$_{q_3}$—}$_{k_6}$—R$_6$;

k$_1$, k$_3$ and k$_5$ are independently an integer of 2 to 10;

k$_2$, k$_4$, k$_6$, m$_1$, m$_2$, m$_3$, p$_1$, p$_2$, p$_3$, p$_4$, p$_5$, p$_6$, q$_1$, q$_2$, and q$_3$ are independently 0 or 1;

Ar$_1$, Ar$_2$, Ar$_3$, Ar$_4$, Ar$_5$, Ar$_6$, Ar$_7$, Ar$_8$, and Ar$_9$ are independently a 1,4-phenylene group, a 1,4-cyclohexylene group, a pyridine-2,5-diyl group, or a pyrimidine-2,5-diyl group;

L$_1$, L$_2$, L$_3$, L$_4$, L$_5$, and L$_6$ are independently —CH$_2$—O—, —O—CH$_2$—, —COO—, —OCO—, —CH$_2$—CH$_2$—, —CH=N—, —N=CH—, —N=M—, —N(O)=N— or —N=N(O)—;

R$_2$, R$_5$, and R$_6$ are independently a hydrogen atom, a halogen atom, a cyano group or a linear or cyclic alkyl group in which each isolated methylene (CH$_2$) group can be replaced by an oxygen atom.

8. A method of manufacturing an optically anisotropic film of any one of claims 1 through 6, said method comprising the steps of: molding a mixture of said polymer and said liquid crystal compound into a film, and stretching said film upon heating.

9. A liquid crystal display apparatus using an optically anisotropic film of any one of claims 1 through 6.

10. A method according to claim 8, wherein the liquid crystal compound is that of claim 7.

11. A liquid crystal display apparatus using an optically anisotropic film of claim 7.

12. A liquid crystalline copolymer comprising recurring units of the formulae (6), (7) and (8) with the numbers n$_6$, n$_7$ and n$_8$ of the recurring units (6), (7) and (8), respectively, per molecule of said liquid crystalline copolymer, wherein the ratio of the n$_6$/(n$_7$+n$_8$) is in the range of 98/2 to 5/95;

(6)

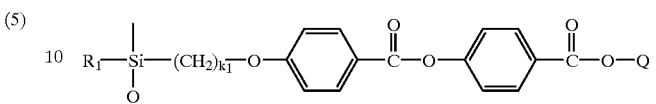

(7)

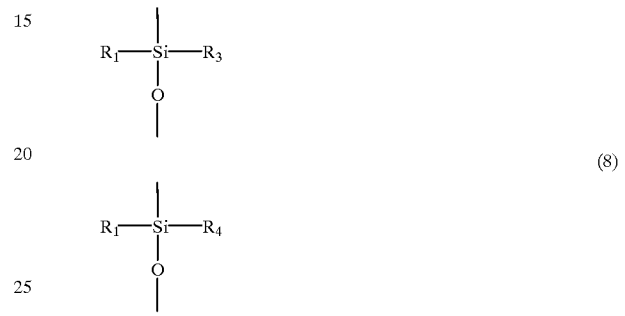

(8)

wherein

—Si—O— constitutes a cyclic or linear chain;

R$_1$ is an alkyl group containing 1 to 10 carbon atoms an alkyl group containing 1 to 10 carbon atoms, or a phenyl group;

Q is a straight-chain alkylene group having 1 to 12 CH$_2$ groups, wherein each isolated, non adjacent CH$_2$ group may be replaced by an oxygen atom, or a cyclohexane group, which may be substituted with a C$_1$–C$_3$ alkyl group, or a C1–C3 alkoxy group at the 4-position;

R$_3$ is a hydrocarbon group containing 3 to 30 carbon atoms, a 4-(cholesteryloxycarbonylphenyl)oxyalkene group, or a group of the formula:

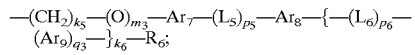

R$_4$ is a hydrocarbon group containing 3 to 30 carbon atoms, or a group of the formula:

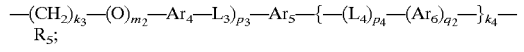

k$_1$, k$_3$ and k$_5$ are independently an integer of 2 to 10 ;

k$_4$, k$_6$, m$_2$, m$_3$, p$_3$, p$_4$, p$_5$, p$_6$, q$_2$, and q$_3$ are independently an integer of 0 or 1;

Ar$_4$, Ar$_5$, Ar$_6$, Ar$_7$, Ar$_8$, and Ar$_9$ are independently a 1,4-phenylene group, a 1,4-cyclohexylene group, a pyridine-2,5-diyl- group, or a pyrimidine-2,5-diyl group;

L$_3$, L$_4$, L$_5$ and L$^6$ are independently —CH$_2$—O—, —O—CH$_2$—, —COO—, —OCO—, —CH$_2$—CH$_2$—, CH=N—, —N=CH—, —N=N—, —N(O)=N— or —N=N(O)—;

R$_5$ and R$_6$ are independently a hydrogen atom, a halogen atom, a cyano group, or a linear or cyclinc alkyl group in which each isolated methylene (CH$_2$) group can be replaced by an oxygen atom.

* * * * *